Oct. 26, 1926.

F. O. BULLIS 1,604,384

PRINTING MACHINE

Filed Jan. 15, 1924     6 Sheets-Sheet 1

INVENTOR.
Frederick O. Bullis
BY
HIS ATTORNEYS.

Oct. 26, 1926.

F. O. BULLIS

PRINTING MACHINE

Filed Jan. 15, 1924

INVENTOR.
Frederick O. Bullis
BY Davis & Simms
HIS ATTORNEYS.

Oct. 26, 1926.　　　　　　　　　　　　　　　　1,604,384
F. O. BULLIS
PRINTING MACHINE
Filed Jan. 15, 1924　　　　6 Sheets-Sheet 3

INVENTOR.
Frederick O. Bullis
BY
HIS ATTORNEYS.

Oct. 26, 1926.

F. O. BULLIS 1,604,384

PRINTING MACHINE

Filed Jan. 15, 1924  6 Sheets-Sheet 4

INVENTOR.
Frederick O. Bullis
BY Davis & Simms
HIS ATTORNEYS.

Oct. 26, 1926.
F. O. BULLIS
PRINTING MACHINE
Filed Jan. 15, 1924
1,604,384
6 Sheets-Sheet 5
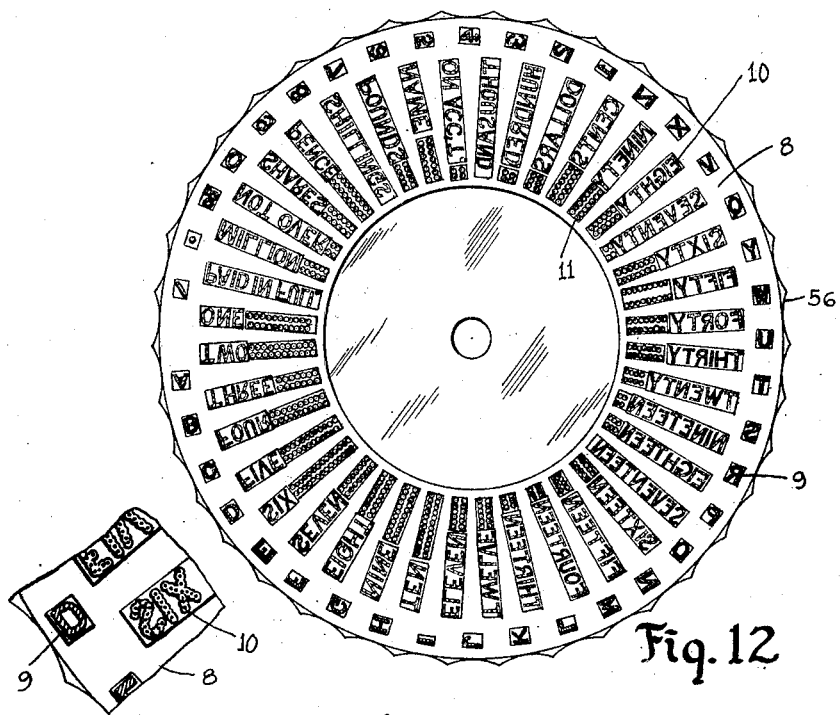
Fig. 12
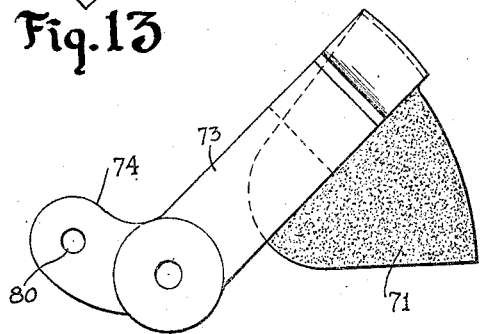
Fig. 13
Fig. 14
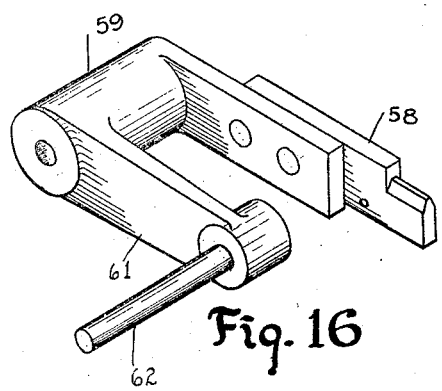
Fig. 16
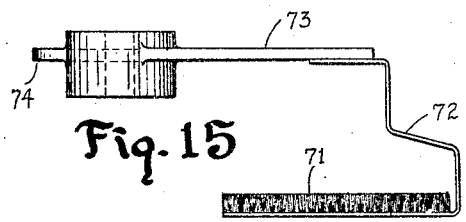
Fig. 15
INVENTOR.
Frederick O. Bullis
BY
HIS ATTORNEYS.

Oct. 26, 1926.　　　　　　　　　　　　　　　　　　1,604,384
F. O. BULLIS
PRINTING MACHINE
Filed Jan. 15, 1924　　　　6 Sheets-Sheet 6

INVENTOR.
Frederick O. Bullis
BY
HIS ATTORNEYS.

Patented Oct. 26, 1926.

1,604,384

UNITED STATES PATENT OFFICE.

FREDERICK O. BULLIS, OF ROCHESTER, NEW YORK, ASSIGNOR TO RITEALL CHECK-WRITER CORPORATION, OF ROCHESTER, NEW YORK, A CORPORATION OF NEW YORK.

PRINTING MACHINE.

Application filed January 15, 1924. Serial No. 686,429.

The present invention relates to printing machines and an object of the invention is to provide a printing machine designed for writing in checks, drafts or the like, the date, the payee's name and the exact amount or in fact filling in checks in all respects except the payer's name. Another object of the invention is to provide a check printing machine which has a set of single type and a set of lines of type, the set of single type being used for filling in the check the date and the payee's name and the amount on the line with the payee's name, and the set of lines of type for filling in the exact amount for which the check is payable. A further object of the invention is to provide a printing means having a set of single type and a set of lines of type with two independently operable platens one for each set and a single work feeding means for feeding the work between the printing means and both platens, so that either set of printing devices may be used in writing a check or other negotiable instruments. Still another object of the invention is to provide a printing means having a set of single type and a set of lines of type combined with two independently operable platens, each of which effects the operation of a single work feeding means, one of said platens effecting the operation of the work feeding means a greater amount than the other. A still further object of the invention is to provide an inking device which normally lies between the platen and the printing member and is shifted from such position upon the relative movement of the platen and the printing member for effecting cooperation between such last two named elements. Still another and further object of the invention is to provide a work feeding mechanism permitting the work to be shifted transversely of the printed lines so that the platen and printing member may operate on different lines. Still further objects of the invention are to provide an improved printing member, an improved platen operating mechanism, an improved means for indicating the position of the printing member, and an improved work feeding mechanism.

To these and other ends, the invention consists of certain parts and combinations of parts, all of which will be hereinafter described, the novel features being pointed out in the appended claims.

In the drawings:

Fig. 12 is a view of the under side of the printing member;

Fig. 13 is a fragmentary enlarged view of the printing member;

Fig. 14 and Fig. 15 are detail views of the ink distributing brush;

Fig. 16 is a detail perspective view of the locking member for the printing member;

Figure 1:
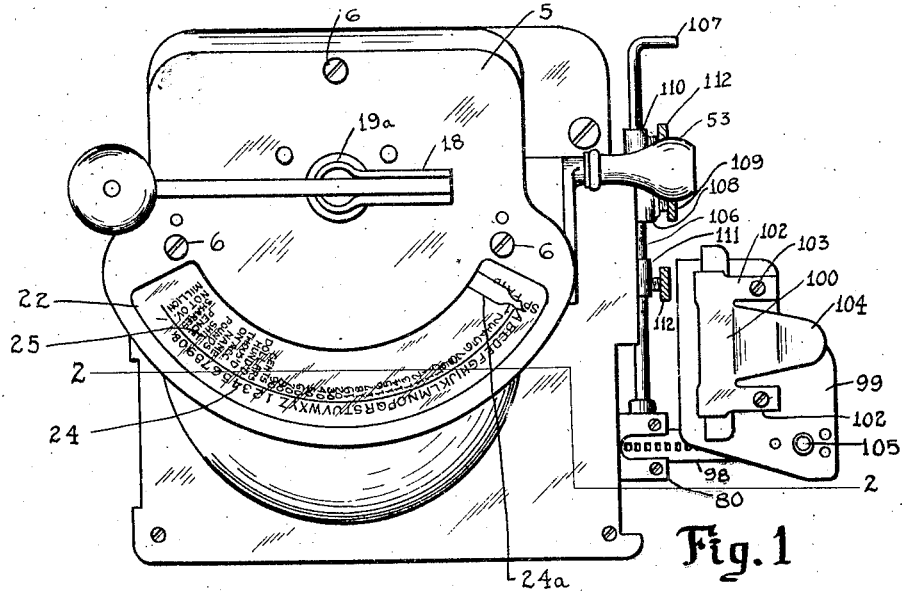
Fig. 1 is a plan view of a machine constructed in accordance with this invention.
Figure 2:
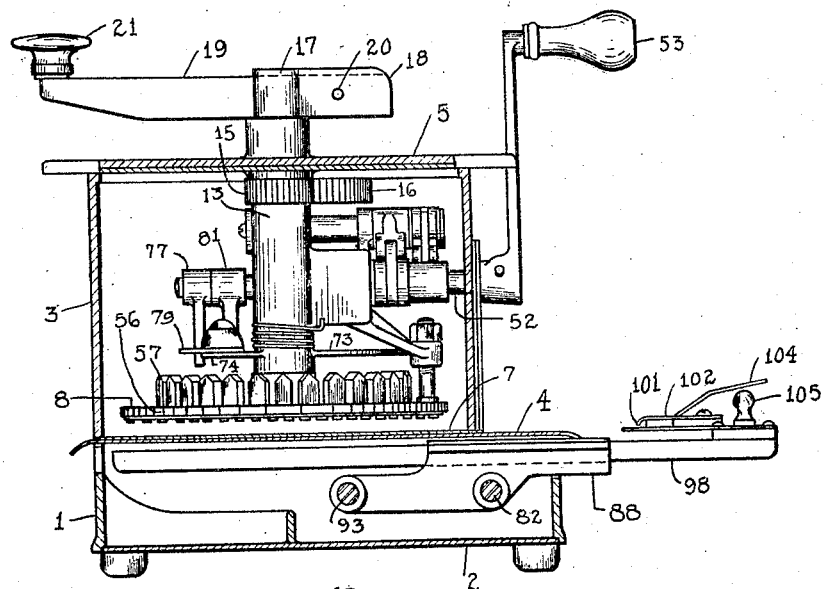
Fig. 2 is a section on the line 2—2, Fig. 1.
Figure 3:
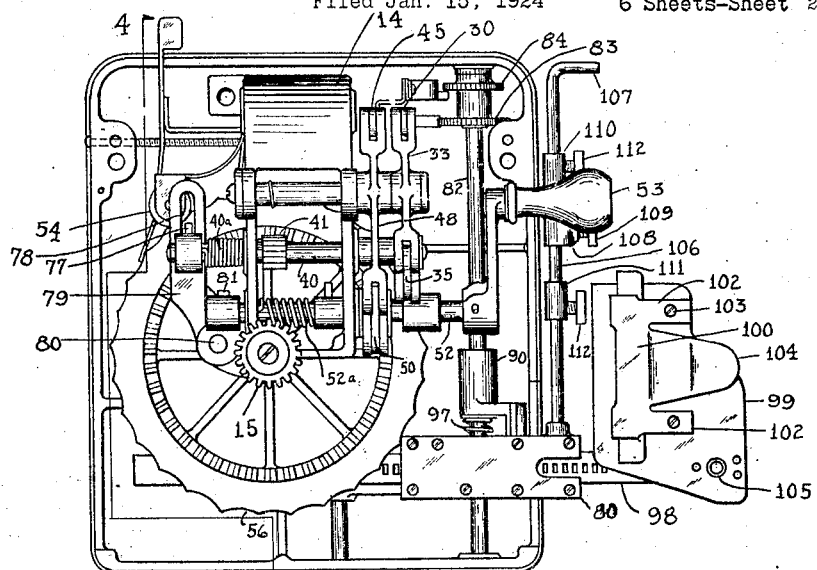
Fig. 3 is a top view of the machine with the upper casing member and the top removed
Figure 4:
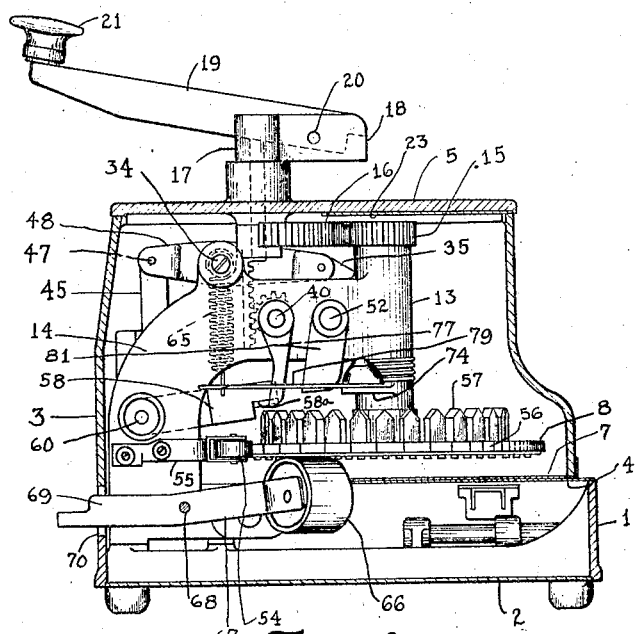
Fig. 4 is a section on the line 4—4, Fig. 3 with the removed parts in place.
Figure 5:
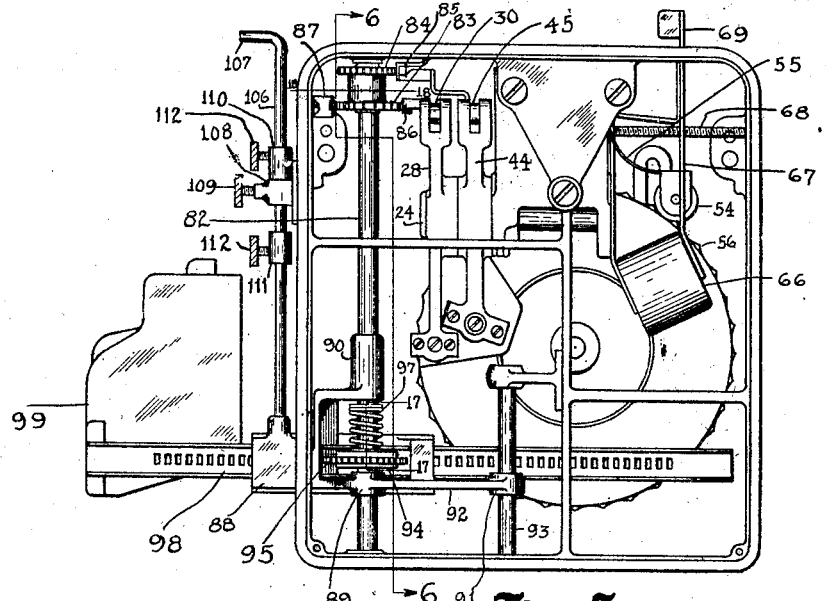
Fig. 5 is a bottom view of the machine with the bottom plate removed.
Figure 6:
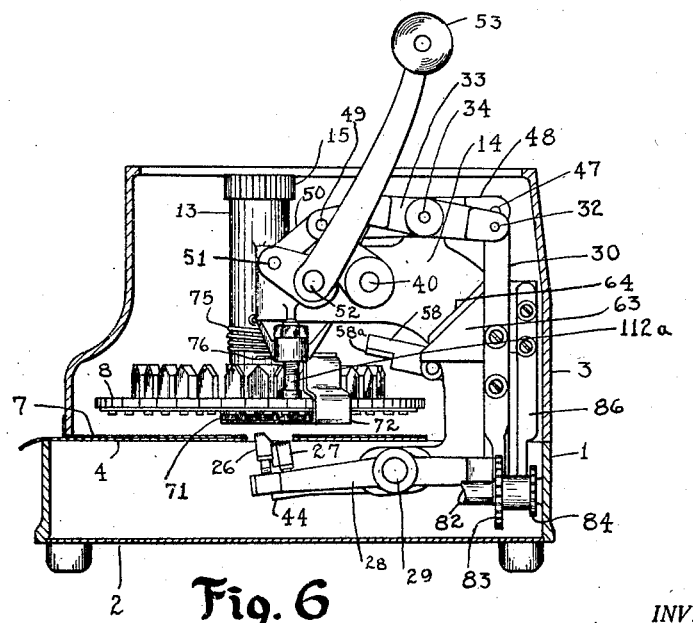
Fig. 6 is a section on the line 6—6, Fig. 5 with the top removed.
Figure 7:
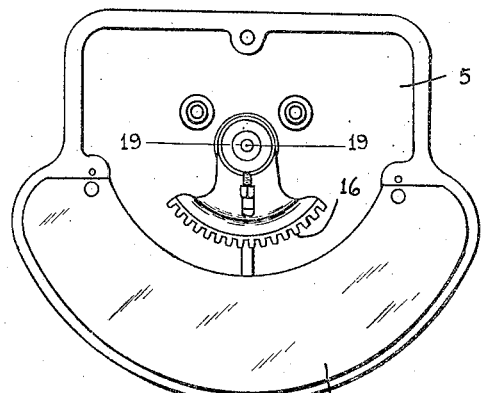
Fig. 7 is an underside view of the top plate.
Figure 10:
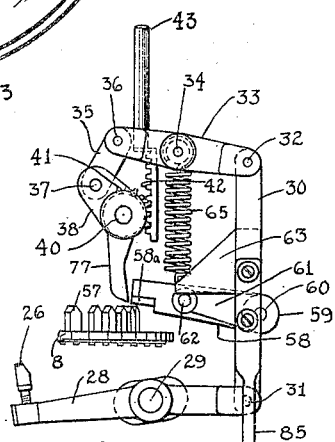
Fig. 10 is a fragmentary view showing the single type of printing platen and its operating mechanism with the platen arranged away from the printing member.
Figure 8:
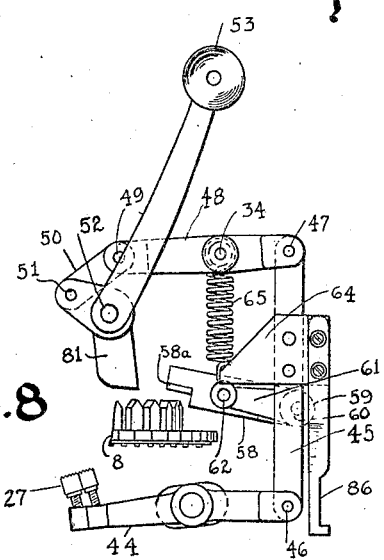
Fig. 8 is a fragmentary view showing the line printing platen and operating mechanism, the platen being shown away from the printing mechanism.
Figure 11:
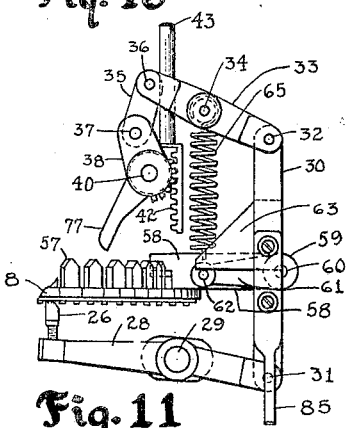
Fig. 11 is a view similar to Fig. 10 showing the platen in cooperation with the printing mechanism.
Figure 9:
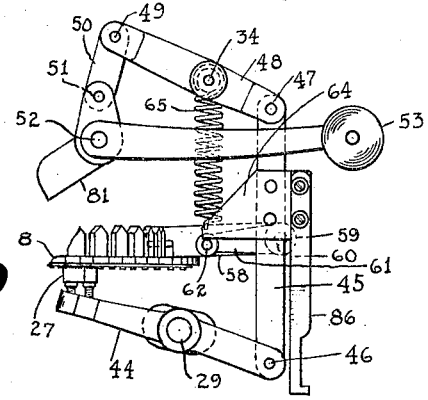
Fig. 9 is a similar view of the platen in cooperation with the printing member.
Figure 17:
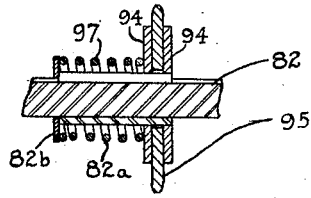
Fig. 17 is a section on the line 17—17, Fig. 5.
Figure 18:
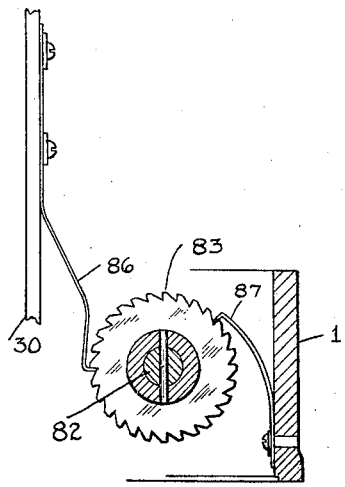
Fig. 18 is a section on line 18—18, Fig. 5.
Figure 19:
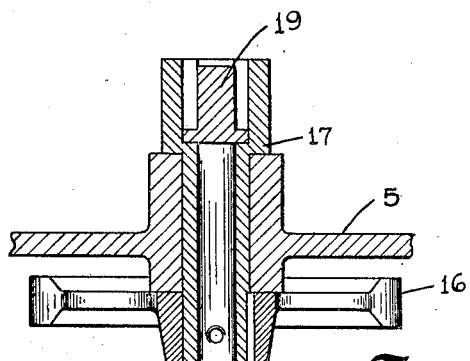
Fig. 19 is a section on line 19—19, Fig. 7.
Figure 20:
Fig. 20 is a face view of a check filled in by this machine.

In the illustrated embodiment of the machine, there is employed a casing consisting of a base portion with a removable bottom plate 2 and an upper portion 3 which is secured at the rear of the base portion 1 and projects forwardly in spaced relation to a work supporting plate 4 secured on the upper part of the base portion below the overhanging part of the upper portion of the frame. A top member 5 is by screws 6 secured to the upper portion 3 of the frame, and a plate 7 is secured to the under side of the overhanging part of the upper portions 3 of the frame and provides with the work support 4 a space or throat through which the check may be fed through the machine.

In the illustrated embodiment there is employed a printing member 8 which, in this instance, is in the form of a disk. This disk has on its under surface the printing devices. The printing devices, in this instance, consist of an annular series of single characters or type 9 comprising all of the letters of the alphabet, as well as the numbers 1 to 9, zero, the character &, a period and the ( /), and any other suitable characters that may be desired. The faces of these characters are all corrugated. Within the annular series of characters are a series of radially arranged lines of type consisting of single words or expressions 10 of different lengths, the short words or expressions having in most instances at their ends protective marks 11, so that nothing can be added to the word or expression. The faces of the words and the protective characters 10 are formed with depressions. The printing member 8 is arranged in the upper portion 3 of the casing and is preferably mounted to turn about a vertical axis. To this end it has a shaft extending upwardly therefrom and journalled in a bearing 13 which in turn is rigidly supported from a bracket 14 projecting upwardly from the base portion 1 in rear of the plates 4 and 7.

For positioning any desired character, word, or expression at printing position, a printing member adjusting mechanism is employed comprising a gear 15 on the upper end of the shaft 12 meshing with a segmental gear 16 which is rigidly secured to a shaft 17 journalled, in this instance, in the top plate 5, said shaft being hollow and extending through the top plate, its upper end being provided with a pair of arms 18 between which an operating arm or lever 19 operates, this arm or lever being pivoted to the arms 18 at 20 near one end and having at its outer end a handle 21. It is apparent that by turning the arm or operating member 19 about an upright axis, the turning of the hollow shaft 17 takes place and consequently the turning of the printing member or disk to position the desired type or type line over the printing point is obtained.

To the end of indicating the type or line of type at printing position, an indicating means is provided. In the illustrative embodiment of the invention the top plate 5 has at its forward portion a cut away or arc shaped opening 22 and beneath this arc shaped opening 22 a thin arc shaped plate 23 is secured, the inner edge of this plate being spaced from the top plate 15 so that an indicating arm 24$^a$ secured to the hollow shaft 17 may extend from said shaft above the plate 23 to operate under the opening 22 and over two sets of indicating matter 24 and 25, the indicating matter 24 corresponding to the annular series of type 9 and the indicating matter of the type 25 corresponding to the words or expressions 10.

The printing positions of the two sets of printing devices are such that a check fed through the machine may be printed on the line for the payee's name through the set of single type or on the line for the amount through the set of lines of type and this without shifting the check. This is due to the arrangement of the type on the printing disk as well as to the fact that both printing lines pass to one side of the center of rotation of the printing member instead of intersecting such center of rotation.

Any suitable means may be employed for selecting the set of printing devices to be used. In this instance, two separate platens 26 and 27 are preferably employed, the platen 26 cooperating with the annular set of type 9 and the platen 27 cooperating with the annular set of lines of type 10.

The platen 26 is supported on a two arm lever 28 mounted to rock on the shaft 29 supported on the base frame below the work support 4 and having a link 30 pivoted thereto at 31 and also pivoted at 32 to a double arm lever 33 which is pivoted at 34 on the bracket arm 14 above the type wheel or printing member. A link 35 is pivoted at 36 to the double arm lever 33 and at 37 to an arm 38 on a shaft 40, said shaft also having a segmental gear 41 thereon which meshes with a rack 42 on the end of a plunger 43, the plunger being guided in the hollow shaft 17 and extending upwardly into engagement with the operating member or lever 19 so that the depression of said lever effects the depression of the plunger with the consequent operation of the platen 26 into engagement with the printing wheel. A spring 40$^a$ surrounds the shaft and tends normally to hold the platen 26 away from the printing position.

The operation of the other platen 27 is effected by mounting said platen on a lever 44 pivoted also on the shaft 29 and having a link 45 pivotally connected thereto at 46 extending upwardly and pivotally connected at 47 to one end of a double arm lever 48, which is pivoted also at 34 and has its other end pivoted at 49 to a link 50 which in turn is pivoted at 51 to a rock shaft 52 extending to the exterior of the machine and having a crank handle 53 thereon through which it may be turned.

A spring 52ª surrounds the shaft 52 and tends normally to move the platen 27 away from printing position. It is apparent that the depression of the crank handle turns the rock shaft 52 and through the connection with the platen moves the latter into cooperation with the printing member or wheel.

Arranged above the platen and above the printing point is an abutment 112ª in the form of a screw adjustable in the abutment 76. This abutment lies close to the upper surface of the printing disk over the printing point, so that when the platen engages the type wheel, this abutment will take any strain off the turning axis of the wheel and prevent also the distortion of the printing wheel through the platen.

When the printing member is turned to position it at any desired character or expression at the printing point, it is held against undue movement in its adjusted position by a centering wheel 54 which is yieldingly pressed toward the periphery of the wheel by a spring support 55, the printing wheel having concave notches 56 on its periphery in which the centering wheel 54 is received.

To lock the wheel against turning and to insure the proper centering relation thereof with reference to the platen whenever either of the platens is operated a locking and centering means common to both platens is employed. This locking and centering means comprises, in this instance, a plurality of projections 57 extending upwardly in annular series from the upper face of the printing wheel 8 and spaced apart to provide locking notches, the upper ends of said projections being bevelled or inclined on opposite sides to guide the locking device to the notches. A locking and centering lever 58 extends from the rocking sleeve 59 which turns on a shaft 60. This rocking sleeve also has another arm 61 from which a projection 62 extends laterally. The depression of the arm 58 forces the bevelled end 58ª between the centering projections 57 and centers the printing wheel, while, at the same time, locks the printing wheel 8 against turning. Both of the platen operating mechanisms operate upon this centering and locking device 58 and to this end the links 30 and 45 are provided, respectively, with arms 63 and 64 which lie above the lateral projection 62 so that when the link 30 is depressed the arm 63 will engage the pin 62 and operate the locking and centering member 58, while when the link 45 is depressed the link 52 will operate the locking and centering member 58. The locking and centering member or detent 58 is moved away from locking position by a spring 65 which is secured to said detent and also secured to the shaft 34.

The inking of the type member may be effected by an inking wheel 66 which is rotatably mounted on a carrier 67 pivoted at 68 and having an arm 69 extending through an opening 70 in the base member 1 to the exterior of the machine. The weight of the inking roller 66 is such that this roller is normally held away from the printing member, but may be moved into engagement therewith by depressing the arm 69 on the outside of the machine. With the end in view of distributing the ink fed to the printing member by the roller 66, an ink distributing member is employed preferably in the form of a brush 71 (see Figs. 14 and 15) formed on a plate arranged on the underside of the printing member and normally lying above the printing point. This brush is supported at its outer edge by a depending portion 72 on an arm 73, this arm being pivoted on the shaft of the printing wheel and having in turn an arm 74. The arm 73 is by a spring 75 surrounding the bearing 13 held against an abutment 76.

To the end that the platen operating mechanism for the platen 26 may operate the ink distributing brush, the shaft 40 has an arm 77 thereon which operates in a slot 78 in a link 79 which is pivoted at 80 to the arm 74. With the depression of the plunger 43 the shaft 40 is turned and swings the arm so that the latter engages one end of the arm 77 and shifts the link 79 in the direction to turn the arm 73, thus carrying the brush away from its position over the printing point. The operation of the brush from the operating mechanism of the platen 27 is obtained by providing an arm 81 on the shaft 52, this arm cooperating with the arm 74 so that when the shaft 52 is turned through the depression of the lever 53, the ink distributing brush 71 will be moved away from printing position.

A feeding mechanism is provided which is controlled by both of the platen operating mechanisms and is shiftable so that the printing machine may print in different lines on the work. In this instance, there is provided a shaft 82 journalled in the base frame and having two ratchet wheels 83 and 84 thereon, the diameter of the ratchet wheel 83 being larger than the diameter of the ratchet wheel 84. The ratchet wheel 83 is controlled by a spring pawl 85 on the link 30 while the ratchet wheel 84 is controlled by a spring pawl 86 carried by the link 45. A holding pawl or detent 87 cooperates with the ratchet wheel 83 and holds the shaft 82 against turning in the reverse direction. On the downward movement of the links 30 and 45 the pawls 85 and 86, respectively, ride over the ratchet wheels 83 and 84, respectively, whereas on the upward movement of the links, the pawls will effect the movement of the shaft 82, the pawl 85 moving the shaft a smaller amount than the pawl 86, due to the difference in diameters of the ratchet wheels 83 and 84. This is desirable because the spacing required for printing the type 9 is less than the spacing required for the words or expressions 10. Arranged to any longitude of the shaft is a carriage 88 which has two bearings 89 and 90 operating on the shaft. This carriage also has a bearing 91 at the end of an arm 92 which is guided on a guide rod 93 also supported on the base 1. Arranged on the shaft 82 between the bearings 89 and 90 is a gear 95, this gear lying between two disks 94 secured to a sleeve 82ª to turn therewith, the sleeve being keyed to the shaft 82 to turn therewith but to move axially thereon when the carriage 88 is shifted longitudinally of the shaft. One of the disks 94 is movable axially of the sleeve and both disks frictionally engaging the opposite faces of the gear 95. The axially movable disk is held yieldingly against the gear 95 by a spring 97 which surrounds the sleeve 82ª and lies between a collar 82ᵇ on the end of the sleeve and the adjacent disk 94. By this arrangement the gear 95 is caused to turn with the shaft 82 and, at the same time, is adapted to turn in either direction relatively to the shaft. Guided on the carriage 88 is a rack bar or carriage 98, which meshes with the teeth of the gear 95 so as to be moved by such gear. The rack bar or carriage 98 has on its outer end a plate or table 99 on which the work holding means is mounted, this work holding means, in this instance, consisting of a spring clamp 100 formed, in this instance, from a single piece of material provided with an engaging edge 101 cooperating with the table or plate 99 and having two spring arms 102. Fastened by screws 103 to the table 99 between the spring arms and in advance of the screws is an operating tongue 104 which when depressed moves the edge 101 away from the table or plate 99. A handle or knob 105 is provided on the table 99 by which the work holding carriage may be moved in either direction independently of the platen operating mechanism.

With the end in view of shifting the work holding means transversely of the printing line, the carriage 88 has a rod 106 extending rearwardly therefrom and provided with a laterally turned portion 107 at its rear end. This rod is guided in a sleeve 108 secured to one side of the base member 1 and provided with a set screw 109 which may engage the rod 106 to hold the rod against movement in the sleeve. The rod 106 also carries two stops 110 and 111 which are adjustably secured to the rod by set screws 112. The stops are adjustable on the rod so as to define the date line on the check and the position of the check for writing in both the payee's name and the amount line.

In making out a check, draft or the like, the work has one end secured by the clamp 100 and the carriage is so adjusted that the date line is at the printing point. The date is then filled in through the single type 9, ordinary letter spacing occurring with each operation of the machine and word spacing being obtained by throwing the pointer 24ª to "sp" on the index 24 which positions the space between "a", (/), etc, over the printing point, so that when the platen moves upwardly, it does not contact with any type.

After the date is filled in, the check is shifted to its other position and the payee's name as well as the amount in figures is written by the type 9. The positioning of the type wheel for this is effected through the lever 19 which is turned about the axis of the hollow shaft for such result. After the type wheel is positioned the lever 19 is depressed which effects the depression of the plunger 43, the locking of the printing wheel through the locking device 58, the shifting of the ink distributing device through the arm 77 and the movement of the platen 26 into engagement with the type wheel. Upon return movement of the plunger 43 the pawl 85 cooperates with the toothed wheel 83 and shifts the work the desired amount.

After the payee's name and the amount in figures is placed in the check, the type wheel is again positioned through the lever 19, but instead of depressing this lever to effect the printing action, a lever 53 is depressed which shifts the ink distributor through the arm 81, moves the detent 58 to locking position and shifts the platen 27 into cooperation with the printing wheel. Upon return movement of the parts the latch or pawl 86 turns the shaft 82 through the toothed wheel 84, thus effecting the movement of the feeding mechanism.

From the foregoing it will be seen that there has been provided a printing machine which is adapted to write into a check, draft or the like, the date, the name of the payee and the amount, in fact, making it possible to fill out the complete check except the name of the maker, this all being filled in in such a manner that surreptitious changing thereof is rendered difficult due to the fact that the fiber of the paper is broken by the platens and the printing characters. Each type line has at its end a serrating device which prevents the adding to the type line or other matter tending to increase the amount for which the check is originally made payable. Two sets of printing devices are employed, one set embodying a plurality of single printing devices and the other set embodying a plurality of lines of type. Two separate platens are brought into cooperation at will with either set of printing devices. A single work feeding mechanism is employed which is operated distances or amounts, a shorter distance or amount for the single set of printing devices and a longer distance or amount for the set consisting of lines of type. A locking device for the printing member is controlled by both the platens and a single ink distributing device is also controlled by both of the platens, and normally lies over the printing point, being shifted away from the printing point upon the movement of either platen toward the printing member so that the reinking of the printing member occurs after each operation, making it possible to use a single type or line of type successively without making one impression lighter than the preceding one made by the same type.

While in this embodiment of the invention two independently operated platens are used for selecting the set of printing characters on the printing member, it is apparent that the invention is not limited to such a construction.

What I claim as my invention and desire to secure by Letters Patent is:

1. A printing machine comprising a disk having printing characters on the under face thereof and locking notches on the upper face, a platen arranged below said disk, a double arm lever connected with the platen at one end to move the platen toward the disk, a link connected with the other end of the lever and extending upwardly above the disk, a pivoted detent arranged above the disk to engage in said locking notches, and an arm extending from the link and cooperating with the detent for moving the detent into a notch of the disk, prior to the engagement of the platen therewith.

2. A printing machine comprising a rotary disk having printing characters on the under face thereof, a platen for cooperating with said printing characters, a double arm lever mounted below the printing disk and connected at one end of the platen to operate the latter into cooperation with the disk, a link connected to the other end of the double arm lever and extending upwardly above the platen, a double arm lever arranged above the platen, a rock shaft arranged above the platen and having a link connection with the last mentioned double arm lever, and means for operating the rock shaft.

3. A printing machine comprising a rotary disk having printing characters on the under face thereof, a platen for cooperating with said printing characters, a double arm lever mounted below the printing disk and connected at one end of the platen to operate the latter into cooperation with the disk, a link connected to the other end of the double arm lever and extending upwardly above the platen, a double arm lever arranged above the platen, a rock shaft connected above the platen and having a link connection with the last mentioned double arm lever, and means for operating the rock shaft embodying a gear on the rock shaft, and a plunger having a rack meshing with the gear.

4. A printing machine comprising a rotary disk having printing characters on the under face thereof, a platen for cooperating with said printing characters, a double arm lever mounted below the printing disk and connected at one end of the platen to operate the latter into cooperation with the disk, a link connected to the other end of the double arm lever and extending upwardly above the platen, a double arm lever arranged above the platen, a rock shaft connected above the platen and having a link connection with the last mentioned double arm lever, means for operating the rock shaft embodying a gear on the rock shaft, a plunger having a rack meshing with the gear, a hollow shaft through which said plunger extends, a connection between the hollow shaft and the printing member for positioning the latter, and a movably operating member on the hollow shaft for turning the latter and also moving the plunger.

5. A printing machine comprising a rotary disk having printing characters on the under face thereof, a platen for cooperating with said printing characters, a double arm lever mounted below the printing disk and connected at one end of the platen to operate the latter into cooperation with the disk, a link connected to the other end of the double arm lever and extending upwardly above the platen, a double arm lever arranged above the platen, a rock shaft connected above the platen and having a link connection with the last mentioned double arm lever, means for operating the rock shaft, an arm on the rock shaft, and an ink distributing device cooperating with the printing disk and controlled by said arm.

6. A printing machine comprising a printing disk having a flat face provided with printing characters and rotatable about an axis perpendicular to said face, a shaft supporting said disk and extending from the face thereof opposite the face provided with printing characters, an ink distributing member arranged to cooperate with the printing characters, and supporting means for the ink distributing member mounted to turn on said shaft on the side of the disk opposite the printing characters, extending over the rear face of said disk around the free edge thereof and supporting the ink distributing member on the side of the printing member provided with the printing characters.

7. A printing machine comprising a printing member, a platen for cooperation with the printing member, a casing enclosing said parts and having a top wall provided with an opening, a plate arranged on the under side of the top wall in spaced relation thereto, a shaft journalled in the top wall and having a gear on the under side thereof connected with the printing member to turn the latter to a desired position, an indicator arranged on the under side of the top wall and operating between the plate and the opening, and an operating member for the shaft arranged exteriorly of the casing.

8. A printing machine comprising a printing disk having printing characters on the underside thereof, a platen arranged below the disk to cooperate with the characters, an ink distributing member normally lying between the platen and the disk and having supporting means extending around the edge of the disk and over the latter to the axis of rotation of said disk, said supporting means being movable about said axis of rotation, a rock shaft having connection with the platen to operate the same, and an arm on the rock shaft having connection with the supporting member of the ink distributing member for moving the ink distributing member out of the path of the platen.

9. A printing machine comprising a printing disk having printing characters on the under side thereof, a platen arranged below the disk to cooperate with the characters, an ink distributing member normally lying between the platen and the disk and having supporting means extending around the edge of the disk and over the latter to the axis of rotation of said disk, said supporting means being movable about said axis of rotation, a double arm lever having connection with the platen to move the latter toward and from the disk, a link extending upwardly from the other end of said double arm lever, a rock shaft having connection with said link to move the latter downwardly, and an arm on the rock shaft having connection with the supporting member of the ink distributing member for moving the ink distributing member out of the path of the platen as the link moves downwardly to move the platen toward the printing member.

10. A check printing machine comprising a printing means having a single set of type and a set of lines of type, two independently operable platens, one for each set, and work feeding means for feeding the work between the printing means and both platens, embodying a shaft, having two ratchet wheels thereon of different diameters, and two pawls, one for each ratchet wheel, each pawl being moved upon the movement of one of the platens.

11. A check printing machine comprising a printing means, having a set of single type and a set of lines of type, two independently operable platens, one for each set, work feeding means for feeding the work between the printing means and both platens embodying a shaft having two ratchet wheels thereon, and two pawls, one for each ratchet wheel, and connections between the pawls and the platens, so that one pawl is operated upon the movement of either of the platens.

12. A check printing machine comprising a printing means having a set of single type and a set of lines of type, two independently operable platens, one for each set, work feeding means for feeding the work between the printing means and both platens embodying a shaft, and two pawl and ratchet devices, each connected to one of the platens to be operated upon the operation of said platen and both being connected to the shaft, one of said pawl and ratchet devices effecting the operation of the shaft a greater amount than the other.

13. A check printing machine comprising a printing means having a set of single type and a set of lines of type, two independently operable platens, one for each set, work feeding means having work engaging devices maintaining feeding engagement with the work during the movement of the check from one end of the machine to the other and devices operated by the platens for effecting the movement of the work engaging devices of the work feeding means an equal amount upon each operation of a platen to print with the set of single type and a greater amount on the operation of the platen to print any one of the set of lines of type, the feed for all of the latter being equal.

14. A check printing machine comprising a printing means having a set of single type and a set of lines of type, said sets having their printing points in immediate proximity to each other, one above the other, two independently operable platens arranged in proximity to each other, one for each set of type, and a work feeding carriage movable to carry the work back and forth in a straight line between the platens and the printing means so that after the check has been printed on one line through one set of type, it may be shifted backwards to print on another line with the other set of type.

15. A check printing machine comprising a printing member having a set of type and a set of lines of type, two independently operable platens, one for each set, and work feeding means for feeding the work between the printing means and both platens embodying work engaging means, a shaft connected to the work engaging means for moving the latter and two pawls operably connected to the shaft to shift the latter different distances, and means connecting each pawl with a different platen so that upon the operation of either platen a pawl will be shifted to shift the work engaging means.

16. A check printing machine comprising a printing disk rotatable about an axis perpendicular to the plane of the work and having two sets of type, both having their printing points on one and the same side of the axis of turning of the printing disk and each adapted to print on a line different from the other, feeding means for moving the work in the direction of the printing lines, and two independently operable platens situated in proximity to each other on one and the same side of the axis of turning of the printing disk, each of said platens having connection with the feeding mechanism so that the feeding mechanism operates upon the operation of each platen.

17. A check printing machine comprising a printing disk rotatable about an axis perpendicular to the plane of movement of the work and having a set of lines of type arranged about said axis of rotation in spaced relation and a set of single type also arranged about said axis of rotation farther from the center than the set of lines of type and positioned in the spaces between the lines of type, and two independently movable platens, one for each set of type, both being situated on one and the same side of the axis of turning of the printing wheel.

18. A printing machine comprising a printing disk rotatable about an axis perpendicular to the plane of feed of the work and having two sets of type, each having a distinct printing line, and the axis of the printing wheel intersecting the work above both of said sets of lines, the members of one of said sets being longer than the members of the other and when at printing point arranged at an angle to the printing line and the other of said sets having the individual members thereof at printing point parallel with the printing line, and the printing points of both sets being on one and the same side of the axis of turning of the printing disk.

19. A check printing machine comprising a printing means having a set of single type and a set of lines of type, two independently operable platens, one for each set, a work feeding means for feeding the work between the printing means and both platens embodying a shaft having two ratchet wheels thereupon of different diameters, an operating means for one of the platens having a pawl for cooperating with one of the said ratchets to move the work a distance corresponding to the length of a type in the set of single type, and an operating means for the other platen having a pawl cooperating with the other ratchet wheel for effecting the movement of the work feeding means a distance corresponding to a line of type in the set of lines of type.

20. A check printing machine comprising a rotary printing disk having an annular set of single type and an annular set of lines of type, the lines of type being radial to the axis of turning of the disk, and the set of single type being arranged about the set of lines of type and on lines which pass to one side of the axis of turning of the disk.

21. A check printing machine comprising a printing means having two sets of printing devices, two independently operable platens, one for each set, an operating means for each platen, work feeding means for feeding the work between the printing means and both platens, and an ink distributing device operating between the printing means and both platens and controlled by the operating means of both platens.

22. A check printing machine comprising a printing member having two sets of printing devices thereon, two independently movable platens, one for each set, operating means one for each platen, a single ink distributing device cooperating with types of both sets positioned at the printing points, and connection between the ink distributing device and the operating means of the two platens to move the ink distributing device out of cooperation with the type of both sets at the printing points, so that the platen operated by the operating means may cooperate with the type of one set at printing point.

23. A check printing machine comprising a rotary disk having two sets of printing devices, on one face thereof and locking notches on the opposite face, two platens, one for each set of printing devices. two double arm levers, each having one arm connected to one of the platens, two links, each connected to the other arm of one of the platens, two independently operable operating members, each connected to one of the links, and a pivotally mounted locking device arranged to enter the locking notches on the printing member and operated by either of the links when such link is moved by its operating member.

24. A check printing machine comprising a rotary printing member having two sets of printing devices, two platens, one for each set of printing devices, an ink distributing member normally lying between the platens and the printing devices and cooperating with the latter, said ink distributing member being rotatable about the axis of rotation of the printing member, and two independently operable operating means, one for each platen having connection with the single distributing device to move the latter out of the path of the platen as such platen moves toward the printing member.

25. A check printing machine comprising a printing disk having two sets of printing devices on one face thereof, two platens, one for each set of printing devices, an ink distributing device normally lying between the platens and the printing devices while cooperating with said devices, said distributing device having a supporting member extending around one edge of the disk and toward the axis of rotation of the disk, being mounted to turn about such axis of rotation independently of the disk, a spring normally holding said printing device in position between the platens and the printing devices, and two independently operable operating means for the platen each having connection with said ink distributing device to move it out of the path of a platen as the latter moves toward the printing member.

26. In a check printing machine the combination with a printing member and a platen, one of which is movable toward and from the other, of a feeding mechanism for feeding the work between the printing member and the platen, said feeding mechanism embodying a shaft having a ratchet wheel operated by the movable element, and a work holding device adjustable longitudinally of the shaft and geared to the shaft to be moved by said shaft transversely of the shaft.

27. In a printing machine the combination with a printing member, and a platen, one of which is movable toward and from the other, of feeding mechanism for feeding the work between the platen and the printing member, comprising a shaft, a ratchet wheel on the shaft moved by the movable member of the first two named elements, a gear on said shaft, a carriage movable longitudinally of the shaft, and a second carriage guided on the first named carriage and driven by the gear on the shaft.

28. In a printing machine, the combination with a printing member and a platen, one of which moves toward and from the other, of feeding mechanism for feeding the work between the platen and the printing member comprising a shaft, a ratchet wheel on the shaft moved by the movable member of the first two named elements, a gear having a slip connection with the shaft and movable longitudinally thereof, a carriage movable longitudinally of the shaft and moving the gear therewith, and a second carriage guided on the first named carriage and driven by the gear on the shaft.

29. In a printing machine, the combination with a printing member and a platen, one of which is movable toward the other, of a feeding mechanism for feeding the work toward the platen and the printing member embodying a carriage movable transversely of the printing line, a second carriage movable on the first named carriage longitudinally of the printing line, a rod extending from the first named carriage, a stop on the frame of the machine through which the rod is guided, and adjustable stops on the rod for cooperating with the stop on the frame of the machine.

FREDERICK O. BULLIS.